United States Patent [19]

Fukuda

[11] Patent Number: 4,520,883
[45] Date of Patent: Jun. 4, 1985

[54] COMBINATORIAL WEIGHING METHOD AND APPARATUS WITH VOLUME SENSING

[75] Inventor: Masao Fukuda, Shiga, Japan

[73] Assignee: Kabushiki Kaisha Ishida Koki Seisakusho, Kyoto, Japan

[21] Appl. No.: 530,681

[22] Filed: Sep. 9, 1983

[30] Foreign Application Priority Data

Sep. 11, 1982 [JP] Japan ............................ 57-158348

[51] Int. Cl.$^3$ .......................................... G01G 19/22
[52] U.S. Cl. .......................................... 177/1; 177/25; 177/50; 177/DIG. 6; 222/55; 222/56; 222/77; 222/159; 73/149; 250/577
[58] Field of Search ............... 177/1, 25, 50, DIG. 6, 177/DIG. 12; 222/56, 64, 158, 159, 77, 55; 73/149, 291, 293, 861.03; 250/577

[56] References Cited

U.S. PATENT DOCUMENTS 4,397,364 8/1983 Hirano .................................. 177/25
4,407,108 10/1983 Craig .................................. 177/25 X

FOREIGN PATENT DOCUMENTS 605108 4/1978 U.S.S.R. .............................. 73/293

Primary Examiner—E. A. Goldberg
Assistant Examiner—Fred L. Kampe
Attorney, Agent, or Firm—Staas & Halsey

[57] ABSTRACT

A weighing and packaging system operates by combining weight data from a plurality of weighing machines, obtaining a combination of weighing machines giving a total combined weight value equal to a target value or closest to the target value within preset allowable limits, discharging articles from those weighing machines belonging to the combination obtained, and packaging the discharged articles. In performing combinatorial weighing, the articles discharged from the combinatorial weighing machine are temporarily retained in a cylinder, and light-emitting and light-receiving elements are arranged to detect the level of the retained articles, thereby making it possible to detect the volume of the articles charged into a package. There are provided a target value correction unit for correcting the target value based on the magnitude of the detected volume, and computing means for obtaining a combination of weighing machines giving a total combined weight value equal to the corrected target value or closest to the corrected target value within preset allowable limits. Articles are discharged from this combination of weighing machines. The target value is increased to enlarge the volume of the discharged articles when the volume is too small, and decreased to reduce the volume when the volume is too large. Therefore, the weight of the discharged articles can be maintained within the preset allowable weight limits while the volume of the articles is held within allowable volume limits.

11 Claims, 6 Drawing Figures

COMBINATORIAL WEIGHING METHOD AND APPARATUS WITH VOLUME SENSING

BACKGROUND OF THE INVENTION

This invention relates to a combinatorial weighing method and apparatus therefor. More particularly, the invention relates to a combinatorial weighing method and apparatus capable of holding, within allowable limits, the volume of weighed articles packaged in a weighing and packaging system having a combinatorial weighing apparatus and a packaging machine.

A weighing and packaging system includes a combinatorial weighing apparatus and a packaging machine. The combinatorial weighing apparatus computes combinations of weight values obtained from a plurality of weighing machines, selects a combination (referred to as the "optimum" combination) that gives a total combined weight value equal to a target weight value or closest to the target weight value within preset allowable limits, and discharges articles from those weighing machines corresponding to the selected combination. The packaging machine packages the articles discharged by the combinatorial weighing apparatus. Such a weighing and packaging system performs a highly accurate weighing operation and is very convenient in that the operations from weighing to the filling and packaging of bags or the like take place fully automatically.

Some articles, such as cornflakes, experience widely different degrees of swelling because of such processing conditions as applied temperature and material mixture. Such articles therefore differ in shape and size and vary greatly in apparent specific gravity. They also tend to crumble. When weighing out these articles combinatorially and then packaging them, there are instances where the volume of the packaged product is too large or too small, even though the weight of the articles in the bag or package is equal to the target weight value or closest to the target weight value within the preset limits. In other words, the change in volume of the packaged articles is in inverse proportion to the change in apparent specific gravity. Since the capacity of a package receiving the articles generally is fixed, too small a product volume in comparison with the package size gives the consumer the impression of a weight shortage. On the other hand, too large a product volume can lead to an improper seal because the package will be too full, and can cause the articles to overflow from the package and impair the packaging process. Accordingly, it is required that volume as well as weight be held within preset allowable limits. Until now, however, a control operation for holding the volume of a commodity within allowable limits has not been put into practice.

SUMMARY OF THE INVENTION

An object of the present invention is to provide a combinatorial weighing method and apparatus therefor, in which both the weight and volume of a commodity can be held within preset allowable limits.

According to the present invention, the foregoing object is attained by providing a combinatorial weighing system in which the volume of discharged articles is detected and control is effected in such a manner that a target value set for a combinatorial weighing apparatus is corrected so that the volume of the articles to be packaged will fall within an allowable range. More specifically, control is so effected as to increase the target value within the preset allowable limits when the volume is small and decrease the target value within the preset allowable limits when the volume is large, thereby assuring the volume of articles packaged in a single bag will fall within the allowable volume limits.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
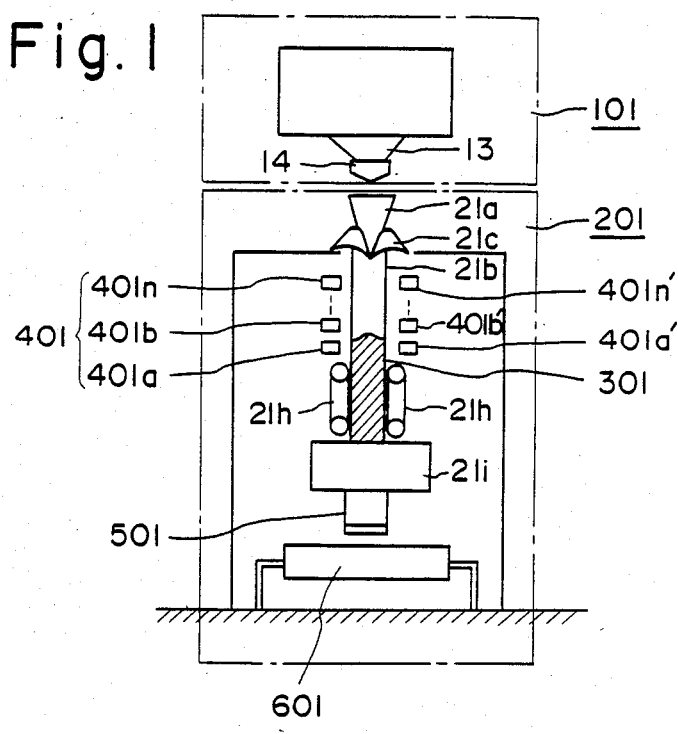
FIG. 1 is a schematic explanatory view for describing a combinatorial weighing method and apparatus according to the present invention.

FIG. 1 is a schematic explanatory view for describing a combinatorial weighing method and apparatus according to the present invention. A combinatorial weighing apparatus 101 computes combinations of weight values obtained from a plurality of weighing machines, selects a combination (referred to as the "optimum" combination) that gives a total combined weight value equal to a target weight value or closest to the target weight value within preset allowable limits, and discharges articles from those weighing machines corresponding to the selected combination.

Figure 2:
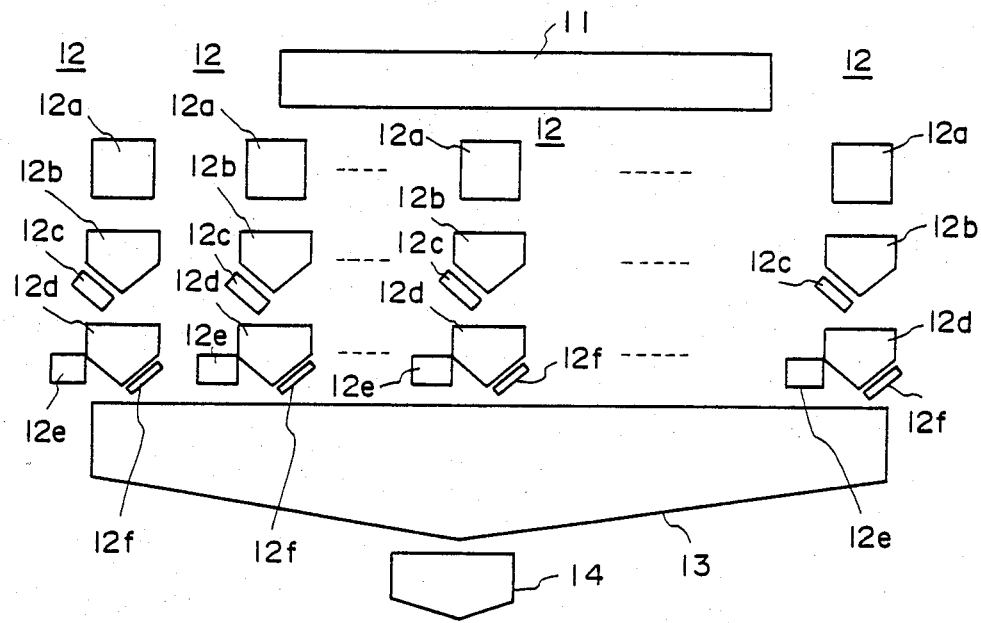
FIG. 2 is an explanatory view of a combinatorial weighing apparatus.

FIG. 2 is an explanatory view of the foregoing combinatorial weighing apparatus. Numeral 11 denotes a main feeder of vibratory conveyance type. Articles to be weighed are introduced into the main feeder 11 and imparted with vibratory motion for a predetermined length of time so as to be dispersed radially outward from the center of the main feeder. Numerals 12, 12 . . . denote a number n of weighing stations which are arranged around the main feeder 11 along radially extending lines to receive the articles dispersed by the main feeder. Each weighing station 12 includes a dispersing feeder 12a, a pool hopper 12b, a pool hopper gate 12c, a weighing hopper 12d, a weight sensor 12e, and a weighing hopper gate 12f. The dispersing feeder 12a comprises an independently vibratable conveyance device for feeding the articles by means of vibration, or an independently operable shutter. In either case, each dispersing feeder 12a is so arranged that the articles received from the centrally located main feeder 11 can be introduced into the corresponding pool hopper 12b disposed therebelow. The pool hopper gate 12c is provided on each pool hopper 12b in such a manner that the articles received in the pool hopper 12b are released into the weighing hopper 12d when the pool hopper gate 12c is opened. Each weighing machine is composed of a weighing hopper 12d and a weight sensor 12e attached thereto. The weight sensor 12e is operable to measure the weight of the articles introduced into the weighing hopper 12d of the weighing machine, and to apply an electrical signal indicative of the measured weight to a combination control unit, not shown. A combination computing unit then selects the combination of articles (the "optimum" combination) which gives a total weight equal to a target value or closest to the target value within preset allowable limits, as will be described below in further detail. Each weighing hopper 12d is provided with its own weighing hopper gate 12f. Upon receiving the signals from each of the weight sensors, a drive controller, not shown, produces a signal to open only the weighing hopper gates 12f of those weighing hoppers 12d that give the optimum combination, these gates 12f discharging the articles from the corresponding weighing hoppers 12d into a common chute 13 where they are collected together. The collecting chute 13 has the shape of a funnel and is so arranged as to receive the articles from any of the circularly arrayed weighing hoppers 12d via the hopper gates 12f, which are located above the funnel substantially along its outer rim. The articles received by the collecting chute 13 are collected at the centrally located lower end thereof by falling under their own weight or by being forcibly shifted along the inclined wall of the funnel by a mechanical scraper or the like, which is not shown. The collecting chute 13 is provided with a timing hopper 14 at the lower end thereof for temporarily holding the collected articles. The arrival of an externally applied release signal from a packaging machine or the like causes the timing hopper 14 to release the retained articles from the system.

Returning to FIG. 1, a packaging machine 201 includes a chute 21a into which the articles from the combinatorial weighing apparatus 101 are discharged, and a transparent cylinder 21b underlying the chute 21a for receiving and guiding the articles so that they may be packaged by the packaging machine in a manner described below. For packaging, the articles are charged into bags of a film material such as polypropylene or vinyl chloride. At the completion of a filling operation, the volume of the articles is measured by a number n of level detectors 401 which, in effect, convert the volume into the level or height of the articles retained in the cylinder, as will be set forth later. The level detectors 401 comprise matched pairs of light-emitting elements 401a, 401b, ... 401n and light-receiving elements 401a', 401b'. ... 401n', respectively.

Figure 3:
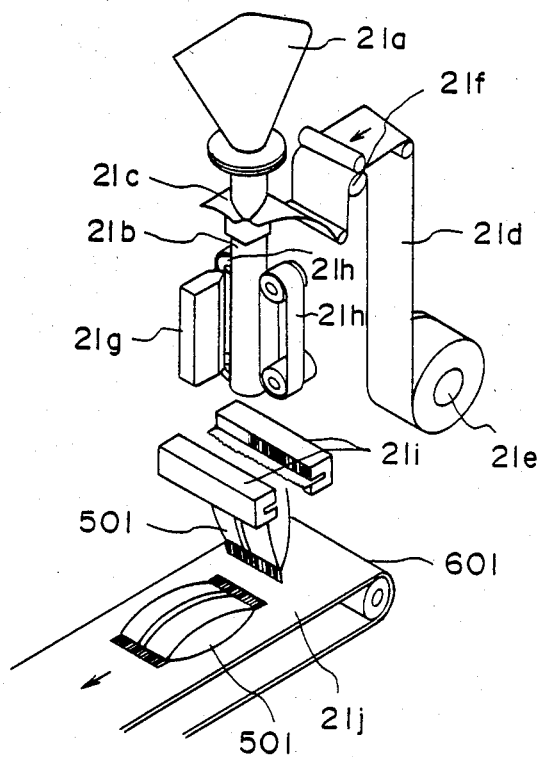
FIG. 3 is a schematic explanatory view of a packaging machine.

FIG. 3 is an explanatory view of the packaging machine. The chute 21a is adapted to collect, at the central lower portion thereof, the weighed articles discharged from the combinatorial weighing apparatus 101. The transparent cylinder 21b is arranged below the chute 21a and temporarily retains the articles, which are designated by numeral 301 in FIG. 1. The packaging machine further includes a former 21c for forming a film 21d into a cylindrical shape, a film bobbin 21e, a film feed roller 21f, a longitudinal sealer 21g for sealing a side opening in the cylindrically shaped film, film feed rollers 21h, 21h for feeding downwardly the film cylinder sealed by the longitudinal sealer 21g, a lateral sealer 21i for sealing openings in the top and bottom of the film cylinder, and a conveyor 21j for conveying bags 501 in which articles have been packaged.

The combinatorial weighing apparatus 101 computes combinations of weight values obtained from a plurality of weighing machines, selects the optimum combination that gives a total combined weight value equal to a target weight value or closest to the target weight value within preset allowable limits, and discharges articles from those weighing machines corresponding to the selected combination. These articles are discharged into the collection chute 13 and are temporarily retained in the timing hopper 14. In response to a command from the packaging machine 201, the timing hopper 14 opens and releases the articles into the cylinder 21b via the chute 21a. Meanwhile, film taken from the film bobbin 21e is shaped into a cylinder by the former 21c, a side opening in the film cylinder is sealed by the longitudinal sealer 21g, and a bottom opening in the film cylinder is sealed by the lateral sealer 21i, thereby converting the film cylinder into a bag 501, the bottom of which is closed. The bag 501 is brought to a stand-by position below the cylinder 21b. If articles are now discharged through the chute 21a under these conditions, the articles will be received within the bag.

A bag 501 is placed on the conveyor 21j for delivery once its top opening has been sealed and trimmed. This takes place after the bag has been filled with articles discharged from the combinatorial weighing apparatus 101 in accordance with the immediately preceding combinatorial computation. Thenceforth, a film bag, whose side and bottom openings have been sealed, is pulled down by the film feed rollers 21h, 21h and, at the same time, the weighed articles also travel in a downward direction together therewith.

Thereafter, when articles are again discharged from the combinatorial weighing apparatus, the upper opening of the bag 501 is sealed by the lateral sealer 21i, and the bag is severed from the remaining film and placed on the conveyor 21j for delivery. These combinatorial weighing and packaging steps are then repeated in the manner described.

In accordance with a feature of the present invention, the volume of articles 301 discharged into the cylinder 21b is detected by the group of level detectors 401, composed of the pairs of light-emitting elements 401a, 401b, ... 401n and light-receiving elements 401a', 401b'. .. 401n'. Then, based on the detected volume, a correction is effected in the target weight value set for the combinatorial weighing apparatus 101, and the apparatus is controlled in such fashion that the volume of articles to be packaged will fall within allowable limits. More specifically, when the volume becomes low in value (i.e., when the apparent specific gravity increases), the target weight value is increased within the allowable limits set for it. When the volume takes on a large value (i.e., when the apparent specific gravity decreases), on the other hand, the target weight value is reduced within the allowable limits. In this manner, the volume of the articles enclosed in a bag can be made to fall within allowable limits.

Figure 4:
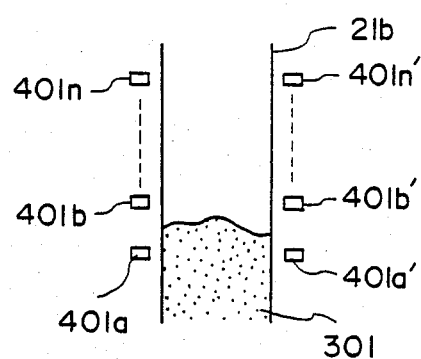
FIG. 4 is a view showing the relation between the peak position of weighed articles and the positions of level detectors.
Figure 5:
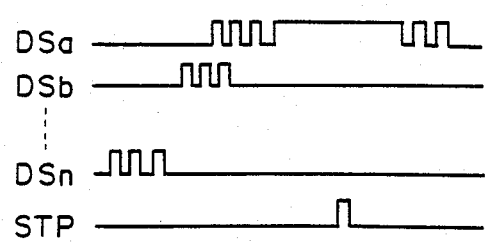
FIG. 5 is a waveform diagram of detection signals.

Let us assume that the articles 301 have risen to a peak between the light-emitting and light-receiving elements 401a, 401a' of a first level detector and the light-emitting and light-receiving elements 401b, 401b' of a second level detector, as shown in FIG. 4. The light-receiving elements 401a', 401b', ... 401n' generate detection signals DSa, DSb, ... DSn, depicted in FIG. 5, from which it can be determined that the articles 301 have risen to a peak located between the first and second level detectors. In FIG. 5, portions showing chatter indicate that the articles are passing through the cylinder 21b. When chattering ends, each of the detection signals attains a steady state. At this time, therefore, a strobe signal STP synchronized to the packaging machine is generated, in response to which each of the detection signals is read.

Figure 6:
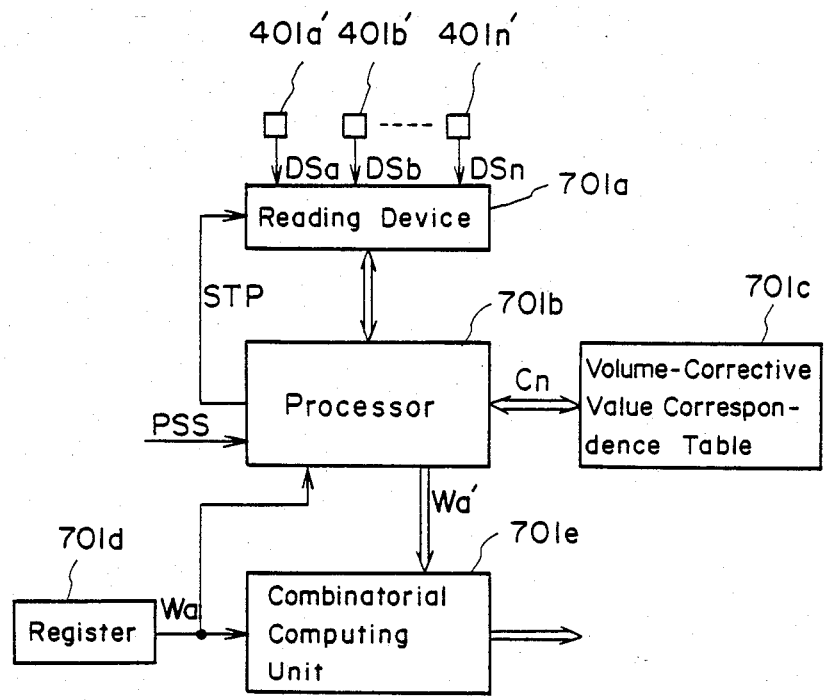
FIG. 6 is a block diagram of a target value correction unit according to the present invention.

FIG. 6 is a block diagram of a target value correction unit in accordance with the present invention. The unit is incorporated within the combinatorial weighing apparatus. The detection signals DSa, DSb, ... DSn, which are produced by the light-receiving elements 401a', 401b', ... 401n' of the first through n-th level detectors, are applied to a reading device 701a. A processor 701b applies the strobe signal STP to the reading device 701a in synchronization with a packaging machine synchronizing signal PSS. In response to the signal STP, the detection signals DSa, DSb, ... DSn are read by the reading device 701a. The processor 701b investigates the logic level of these detection signals and, on the basis of the results obtained, determines in which of a number n of predetermined volume ranges a volume falls. A correspondence table memory 701c stores the correspondence between volumes and corrective values. The corrective values stored in the memory 701c are such that the larger the volume (the smaller the specific gravity), the smaller the target value will be in the combinatorial weighing apparatus, and such that the smaller the volume (the larger the specific gravity), the larger the target weight value will be. When the processor 701b has investigated the logic of the detection signals DSa, DSb, ... DSn and determined the volume of the articles thereby, the processor then goes to the correspondence table memory 701c to read out a corrective value Cn conforming to said volume. Thereafter, using the corrective value Cn and a target value Wa, which has been stored beforehand in a register 701d, the processor 701c performs the operation Wa+Cn→Wa'. The result of this operation is applied as a new target value to a combinatorial computing unit 701e. This unit then proceeds to find an optimum combination giving a value equal to the updated target value Wa' or closest to the updated value within preset allowable limits, and produces an output signal indicative of the optimum combination.

Thus, in accordance with the present invention as described hereinabove, the target weight value is increased to enlarge the volume when the volume is too small, and decreased to reduce the volume when the volume is too large. Therefore, the weight of the articles can be maintained within the preset allowable weight limits while the volume of the articles is held within the allowable volume limits.

While the invention has been described in some detail in conjuction with a preferred embodiment thereof, the invention is not limited to the embodiment and many modifications can be made within the scope of the claims. For example, it has been described hereinabove that a plurality of the level detectors are provided. However, in the simplest arrangement, a single level detector will suffice. In addition, rather than revising the target value each time, the value can be updated based on average volume taken over several weighing cycles.

What we claim is:

1. A combinatorial weighing method comprising the steps of:
(a) combining weight data from a plurality of weighing machines of a combinatorial weighing apparatus for weighing articles to obtain the respective combination from said weighing machines giving a total combined weight value that is closest to a target value and which is within preset allowable limits thereof;
(b) discharging the articles from those weighing machines belonging to the combination obtained;
(c) obtaining the volume of the discharged articles; and
(d) correcting said target value, based on the magnitude of the volume obtained, for subsequent operation of said combinatorial weighing apparatus.

2. The method according to claim 1, wherein said corrected target value increases, within the preset allowable limits, with decrease in the obtained volume.

3. The method according to claim 1, comprising temporarily retaining said discharged articles within a package-forming cylinder for obtaining said volume based on the level of the articles in said cylinder.

4. A combinatorial weighing method comprising the steps of:
(a) combining weight data from a plurality of weighing machines of a combinatorial weighing apparatus for weighing articles to obtain a combination from said weighing machines giving the total combined weight value closest to a target value and which is within preset allowable limits thereof;
(b) discharging the articles from those weighing machines belonging to the combination obtained;
(c) obtaining the specific gravity of the discharged articles; and
(d) correcting the target value, based on the magnitude of the specific gravity obtained, for subsequent operation of said combinatorial weighing apparatus.

5. The method according to claim 4, wherein said corrected target value increases, within the preset allowable limits, as the specific gravity increases in value.

6. A combinatorial weighing system, comprising:
a plurality of weighing machines to which articles are fed;
combinatorial weighing apparatus for combining weight data from said plurality of weighing machines to obtain the combination of said weighing machines giving a total combined weight of the respective articles that is closest to the target value and which is within preset allowable limits thereof, and for discharging articles from the respective weighing machines belonging to the combination obtained;
detecting means for detecting the volume of the discharged articles; and
target value correcting means for correcting the target value, for subsequent operation of said combinatorial weighing apparatus, based on the magnitude of the volume detected by said detecting means.

7. The system according to claim 6, wherein said detecting means comprises a cylinder for retaining the discharged articles, a light-emitting element, and a light-receiving element for receiving light from said light-emitting element to detect the level of the articles in said cylinder.

8. The system of claim 6 or 7, comprising packaging means for packaging the articles discharged from each obtained combination of the weighing machines.

9. The system of claim 8, wherein the packages of said articles provided by said packaging means are transparent, and the operation of said detecting means is through said transparent packages.

10. The method of claim 1, 2, 3, 4 or 5, comprising packaging the articles discharged from each obtained combination of the weighing machines.

11. The method of claim 10, wherein the packages of said articles are transparent, and said step of obtaining the respective property, either volume or specific gravity of the discharged articles occurs through said transparent packages.

* * * * *